United States Patent
Restle

(10) Patent No.: US 11,568,180 B2
(45) Date of Patent: Jan. 31, 2023

(54) METHOD AND CLOUD SERVER FOR TRAINING A NEURAL NETWORK FOR TRIGGERING AN INPUT SIGNAL IN A MEASUREMENT DEVICE AND METHOD FOR AUTONOMOUS DETERMINING A TRIGGER TYPE/PARAMETER

(71) Applicant: Rohde & Schwarz GmbH & Co. KG, Munich (DE)

(72) Inventor: Markus Restle, Unterhaching (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 628 days.

(21) Appl. No.: 16/570,684

(22) Filed: Sep. 13, 2019

(65) Prior Publication Data

US 2021/0081722 A1    Mar. 18, 2021

(51) Int. Cl.
- *G06V 30/00* (2022.01)
- *G06K 9/62* (2022.01)
- *G06N 3/02* (2006.01)

(52) U.S. Cl.
CPC ......... *G06K 9/6265* (2013.01); *G06K 9/6256* (2013.01); *G06N 3/02* (2013.01)

(58) Field of Classification Search
CPC .... G06V 10/70; G06V 10/766; G06V 10/774; G06V 30/191; G06V 30/19147; G06K 9/6265; G06K 9/6256; G06N 3/02; G06N 3/08; G06N 3/082; G06N 3/084; G06N 3/086; G06N 3/088; G06N 3/0445; G06N 7/023; G06N 7/046; G06N 20/00; G06T 2207/20081; G06T 3/4046
See application file for complete search history.

(56) References Cited

U.S. PATENT DOCUMENTS

| | | | |
|---|---|---|---|
| 5,414,635 A | 5/1995 | Ohta | |
| 10,671,912 B2* | 6/2020 | Gottfried | G06N 3/049 |
| 11,221,929 B1* | 1/2022 | Katz | G06F 11/1004 |
| 11,237,894 B1* | 2/2022 | Baum | G06F 11/076 |
| 2019/0340492 A1* | 11/2019 | Burger | G06N 3/08 |
| 2019/0340779 A1* | 11/2019 | Finkelstein | G06N 3/0445 |
| 2019/0362235 A1* | 11/2019 | Xu | G06N 3/084 |
| 2019/0370642 A1* | 12/2019 | Liu | G06N 3/063 |

(Continued)

FOREIGN PATENT DOCUMENTS

EP    0349328 A2    1/1990

OTHER PUBLICATIONS

Tektronix, "Triggering Fundamentals, with pinpoint/Visual Triggering and Advanced Search & Mark for DPO7000, MISO/DPO/DSA70000 Series Oscilloscopes, Primer, Jul. 2011, EA/FCA-POD", 28 pages.

*Primary Examiner* — Amir Alavi

(74) *Attorney, Agent, or Firm* — Ditthavong, Steiner & Mlotkowski

(57) ABSTRACT

A method for training a neural network for triggering an input signal in a measurement device is provided. The method comprises the steps of providing a trigger type and/or trigger parameter from a cloud server hosting the neural network via a network to the measurement device, triggering the input signal based on the trigger type and/or trigger parameter received in the measurement device, and collecting trigger feedback information from the measurement device at the neural network to train the neural network.

19 Claims, 5 Drawing Sheets

(56) References Cited

U.S. PATENT DOCUMENTS

| | | | |
|---|---|---|---|
| 2020/0130830 A1* | 4/2020 | Dong | G05D 1/0044 |
| 2020/0202213 A1* | 6/2020 | Darvish Rouhani | G06N 3/0454 |
| 2020/0293889 A1* | 9/2020 | Terasaki | G06N 3/063 |
| 2020/0394523 A1* | 12/2020 | Liu | G06N 20/00 |
| 2021/0081722 A1* | 3/2021 | Restle | G06K 9/6265 |

* cited by examiner

METHOD AND CLOUD SERVER FOR TRAINING A NEURAL NETWORK FOR TRIGGERING AN INPUT SIGNAL IN A MEASUREMENT DEVICE AND METHOD FOR AUTONOMOUS DETERMINING A TRIGGER TYPE/PARAMETER

TECHNICAL FIELD

The invention relates to a method and a cloud server for training a neural network for triggering an input signal in a measurement device and a method for autonomous determining a trigger type and/or trigger parameter.

BACKGROUND ART

Generally, in times of an increasing number of measurement applications, there is a growing need of not only a method and a cloud server for training a neural network for triggering an input signal in a measurement device but also a method for autonomous determining a trigger type and/or trigger parameter in order to perform measurements in a highly accurate and efficient manner.

U.S. Pat. No. 5,414,635 A discloses an oscilloscope comprising means for extracting main period components included in a signal to be observed, means for displaying on a screen a waveform of one of the extracted period components and information indicating with which period component the waveform was triggered, and means for triggering with a different period component and switching a sweep rate by an input from an operating section. Disadvantageously, due to the trigger system not being trained, measurements are quite inaccurate and inefficient.

Accordingly, there is a need to provide a method and a cloud server for training a neural network for triggering an input signal in a measurement device and a method for autonomous determining a trigger type and/or trigger parameter, whereby both a high accuracy and a high efficiency are ensured.

SUMMARY OF THE INVENTION

According to a first aspect of the invention, a method for training a neural network for triggering an input signal in a measurement device is provided. The method comprises the steps of providing a trigger type and/or trigger parameter from a cloud server hosting the neural network via a network to the measurement device, triggering the input signal based on the trigger type and/or trigger parameter received in the measurement device, and collecting trigger feedback information from the measurement device at the neural network to train the neural network. Advantageously, both measurement accuracy and measurement efficiency can be ensured. Further advantageously, a respective trigger system or trigger unit can be set autonomously.

According to a first preferred implementation form of the first aspect of the invention, the method further comprises the step of using the trigger feedback information to improve the neural network. Advantageously, for instance, measurement accuracy can further be increased.

According to a second preferred implementation form of the first aspect of the invention, the method further comprises the step of centrally updating the neural network. Advantageously, for example, measurement efficiency can further be increased.

According to a further preferred implementation form of the first aspect of the invention, the method further comprises the step of continuously improving the neural network. Advantageously, for instance, measurement accuracy can further be increased.

According to a further preferred implementation form of the first aspect of the invention, the cloud server provides more processing power than each of respective local devices. Advantageously, for example, measurement efficiency can further be increased.

According to a further preferred implementation form of the first aspect of the invention, the trigger type comprises at least one of a glitch trigger, a width trigger, a runt trigger, a window trigger, a zone trigger, or any combination thereof. Advantageously, any kind of trigger type can be used.

According to a further preferred implementation form of the first aspect of the invention, the trigger parameter comprises at least one of a threshold value, a width value, a signal period value, or any combination thereof. Advantageously, any kind of trigger parameter can be used.

According to a further preferred implementation form of the first aspect of the invention, the method further comprises the step of autonomously determining the trigger type and/or trigger parameter. Advantageously, a user can save time due to said autonomous determination.

According to a further preferred implementation form of the first aspect of the invention, the method further comprises the step of determining at least one autoset parameter of the input signal. Advantageously, the autoset parameter can be determined in a highly accurate and efficient manner.

According to a further preferred implementation form of the first aspect of the invention, the method further comprises the step of processing the at least one autoset parameter in the neural network for triggering. Advantageously, efficiency can further be increased.

According to a further preferred implementation form of the first aspect of the invention, the method further comprises the step of outputting at least a first trigger type and/or trigger parameter by the neural network for triggering. Advantageously, for instance, efficiency can further be increased.

According to a further preferred implementation form of the first aspect of the invention, the at least one autoset parameter comprises at least one of an estimated frequency of the input signal, a peak value of the input signal, a median value of the input signal, a histogram of the input signal, or any combination thereof. Advantageously, any kind of autoset parameter can be used.

According to a second aspect of the invention, a cloud server for training a neural network for triggering an input signal in a measurement device is provided. The cloud server comprises a controller, wherein the controller is configured to provide a trigger type and/or trigger parameter from the cloud server hosting the neural network via a network to the measurement device. Advantageously, both measurement accuracy and measurement efficiency can be ensured. Further advantageously, a respective trigger system or trigger unit can be set autonomously.

According to a first preferred implementation form of the second aspect of the invention, the controller is further configured to trigger the input signal based on the trigger type and/or trigger parameter received in the measurement device. Advantageously, for instance, efficiency can further be increased.

According to a second preferred implementation form of the second aspect of the invention, the controller is further configured to collect trigger feedback information from the measurement device at the neural network to train the neural network. Advantageously, for example, accuracy can further be increased.

According to a third aspect of the invention, a method for autonomous determining a trigger type and/or trigger parameter is provided. The method comprises the steps of determining at least one autoset parameter of an input signal in a measurement device by a trigger unit, processing the at least one autoset parameter in a neural network for triggering, and outputting at least a first trigger type and/or trigger parameter by the neural network for triggering to the trigger unit. Advantageously, the trigger unit may especially comprise or be a trigger controller or a trigger processor.

According to a first preferred implementation form of the third aspect of the invention, the method further comprises the step of triggering the input signal based on the trigger type and/or trigger parameter. Advantageously, for instance, triggering can be performed in a highly accurate and efficient manner.

According to a second preferred implementation form of the third aspect of the invention, the trigger type comprises at least one of a glitch trigger, a width trigger, a runt trigger, a window trigger, a zone trigger, or any combination thereof. Advantageously, for example, any kind of trigger type can be used.

According to a further preferred implementation form of the third aspect of the invention, the trigger parameter comprises at least one of a threshold value, a width value, a signal period value, or any combination thereof. Advantageously, for instance, any kind of trigger parameter can be used.

According to a further preferred implementation form of the third aspect of the invention, the at least one autoset parameter comprises at least one of an estimated frequency of the input signal, a peak value of the input signal, a median value of the input signal, a histogram of the input signal, or any combination thereof. Advantageously, for example, any kind of autoset parameter can be used.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
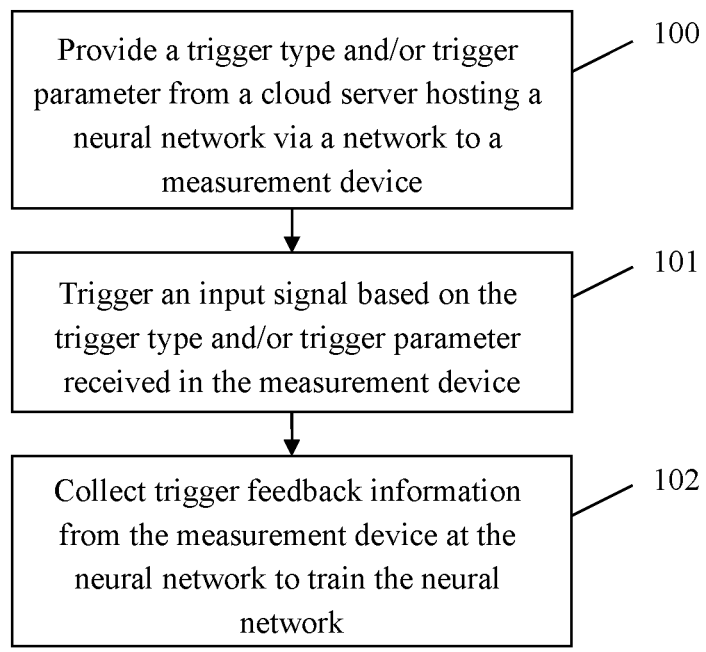
FIG. 1 shows a flow chart of a first exemplary embodiment of the first aspect of the invention.

Firstly, FIG. 1 shows a flow chart of a first exemplary embodiment of the inventive method for training a neural network for triggering an input signal in a measurement device. In a first step 100, a trigger type and/or trigger parameter is provided from a cloud server hosting the neural network via a network to the measurement device. Then, in a second step 101, the input signal is triggered based on the trigger type and/or trigger parameter received in the measurement device. Furthermore, in a third step 102, trigger feedback information is collected from the measurement device at the neural network to train the neural network.

Figure 2:
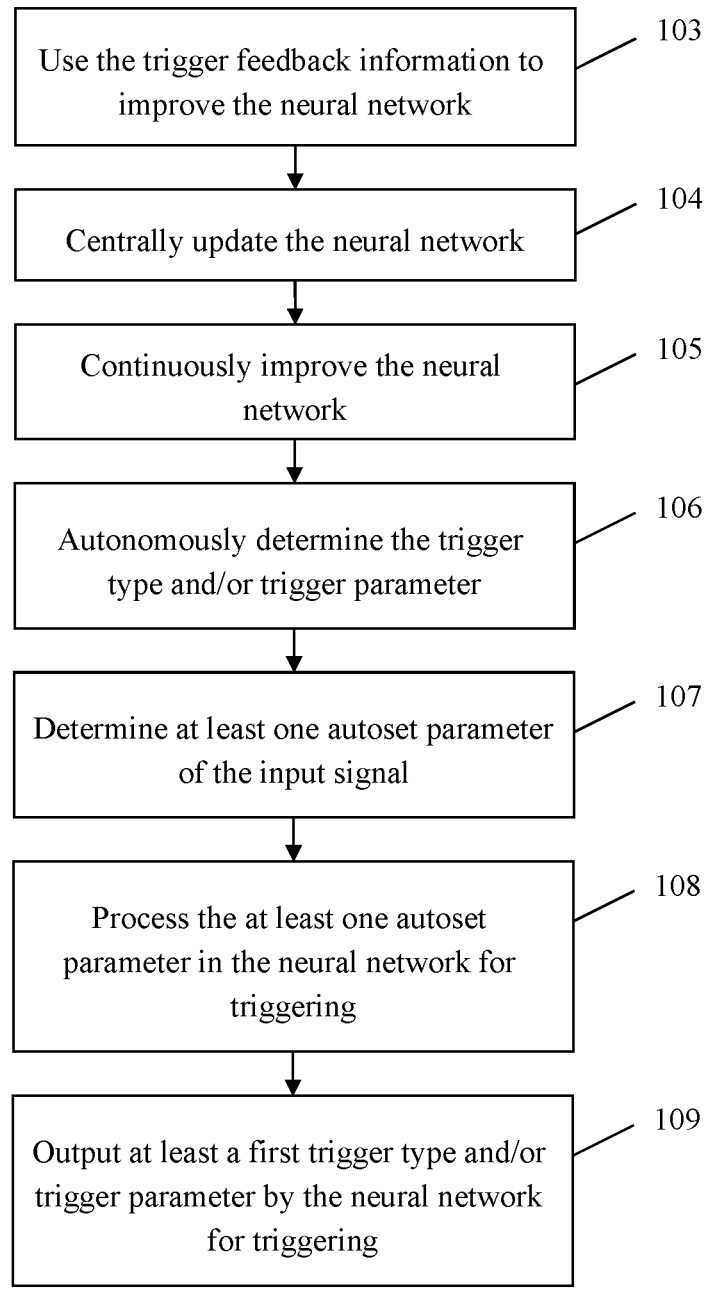
FIG. 2 shows a flow chart of a second exemplary embodiment of the first aspect of the invention.

In this context, and in accordance with FIG. 2, it might be particularly advantageous if the method further comprises the step of using the trigger feedback information to improve the neural network. Furthermore, according to step 104 of FIG. 2, the method may further comprise the step of centrally updating the neural network. Moreover, also in accordance with FIG. 2, the method may further comprise the step of continuously improving the neural network.

With respect to the cloud server, it is noted that the cloud server may especially provide more processing power than each of respective local devices.

With respect to the trigger type, it is noted that the trigger type may preferably comprise at least one of a glitch trigger, a width trigger, a runt trigger, a window trigger, a zone trigger, or any combination thereof. With respect to the above-mentioned trigger parameter, it is noted that the trigger parameter may preferably comprise at least one of a threshold value, a width value, a signal period value, or any combination thereof.

Again, in accordance with FIG. 2, it might be particularly advantageous if the method further comprises the step of autonomously determining the trigger type and/or trigger parameter.

Furthermore, the method may further comprise the step of determining at least one autoset parameter of the input signal. In this context, the method may further comprise the step of processing the at least one autoset parameter in the neural network for triggering.

Moreover, according to step 109 depicted in FIG. 2, the method may especially comprise the step of outputting at least a first trigger type and/or trigger parameter by the neural network for triggering.

With respect to the above-mentioned at least one autoset parameter, it is noted that the at least one autoset parameter may preferably comprise at least one of an estimated frequency of the input signal, a peak value of the input signal, a median value of the input signal, a histogram of the input signal, or any combination thereof.

Figure 3:
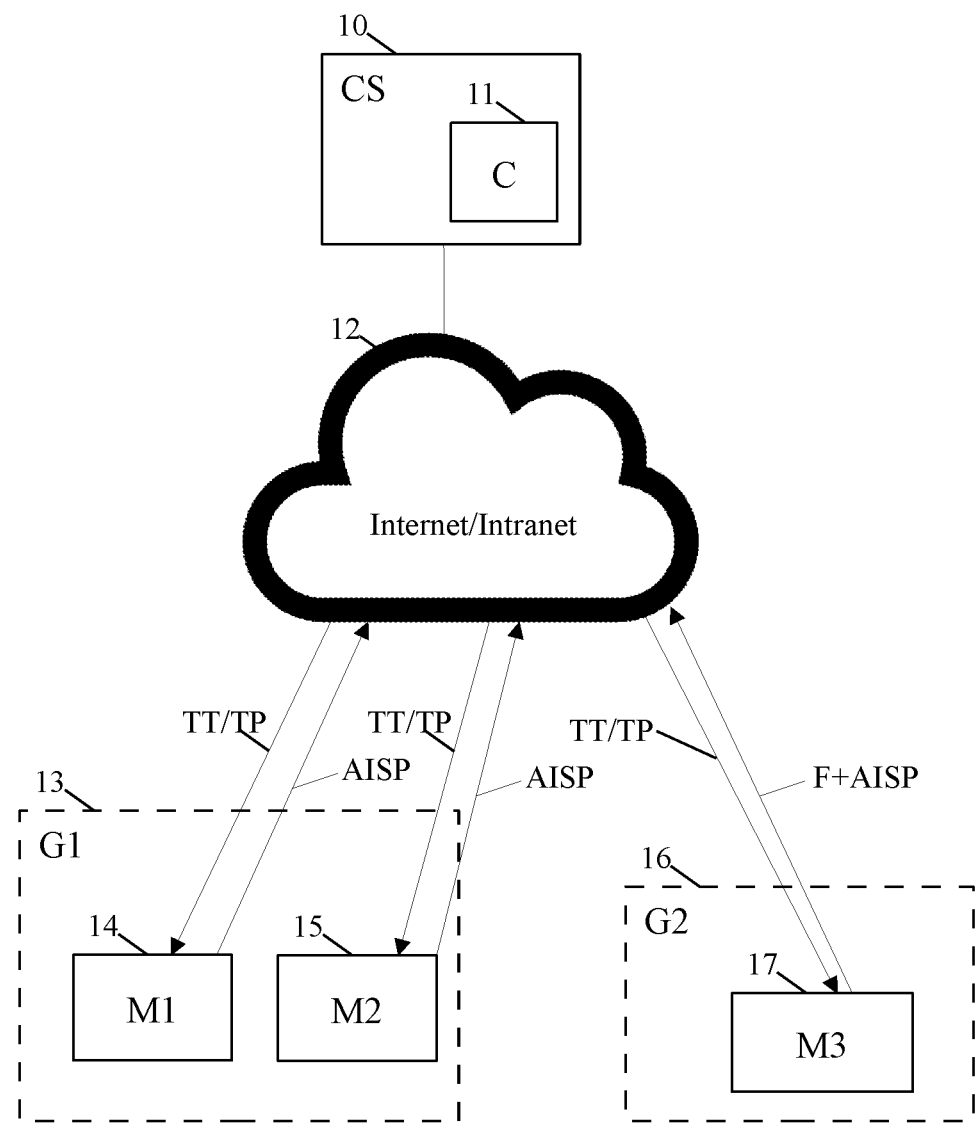
FIG. 3 shows an exemplary embodiment of the second aspect of the invention.

Now, with respect to FIG. 3, an exemplary embodiment of the inventive cloud server 10 for training a neural network for triggering an input signal in a measurement device is illustrated.

In accordance with FIG. 3, the cloud server 10 comprises a controller 11, wherein the controller 11 provides a trigger type and/or trigger parameter TT/TP from the cloud server 10 hosting the neural network via a network, exemplarily the internet and/or an intranet 12, to the measurement device, exemplarily a first group 13 comprising a first measurement device 14 and a second measurement device 15, and a second group 16 comprising a third measurement device 17.

Furthermore, the controller 11 may further trigger the input signal based on the trigger type and/or trigger parameter TT/TP received in the respective measurement device of the measurement devices 14, 15, 17. Moreover, the controller 11 may further collect trigger feedback information F from the measurement device 17 at the neural network to train the neural network. In this context, the controller 11 may preferably use the trigger feedback information F to improve the neural network.

It is noted that it might be particularly advantageous if the controller centrally updates the neural network. In addition to this or as an alternative, the controller 11 may continuously improve the neural network.

With respect to the above-mentioned trigger type TT, it is noted that the trigger type TT may preferably comprise at least one of a glitch trigger, a width trigger, a runt trigger, a window trigger, a zone trigger, or any combination thereof. With respect to the above-mentioned trigger parameter TP, it is noted that the trigger parameter TP may preferably comprise at least one of a threshold value, a width value, a signal period value, or any combination thereof.

It is further noted that it might be particularly advantageous if the cloud server 10 provides more processing power than each of respective local devices such as the measurement devices 14, 15, 17. Furthermore, the controller 11 of the cloud server 10 may autonomously determine the trigger type and/or trigger parameter TT/TP.

In addition to this or as an alternative, the controller 11 of the cloud server 10 or the cloud server 10 may determine at least one autoset parameter of the input signal especially with the aid of a trigger unit, preferably a trigger processor. In this context, the controller 11 or the cloud server 10, respectively, may comprise said trigger unit, preferably said trigger processor.

As an alternative, the trigger unit, preferably the trigger processor, may determine at least one autoset parameter of the input signal. In this context, the trigger unit, preferably the trigger processor, may be comprised by a measurement device such as at least one of the measurement devices 14, 15, 17. Additionally or alternatively, the controller 11 or the cloud server 10, respectively, may process the at least one autoset parameter in the neural network for triggering.

Further additionally or further alternatively, the controller 11 or the cloud server 10 may output at least a first trigger type and/or trigger parameter TT/TP by the neural network for triggering especially to the trigger unit, preferably to the trigger processor.

With respect to the above-mentioned at least one autoset parameter, it is noted that the at least one autoset parameter may preferably comprise at least one of an estimated frequency of the input signal, a peak value of the input signal, a median value of the input signal, a histogram of the input signal, or any combination thereof.

Again, with respect to the cloud server 10, it is noted that the cloud server 10 may comprise a model or a storage storing the model. In this context, said model may especially be always up to date. Furthermore, said model may especially be continuously improved. Moreover, the cloud server 10 may continuously learn especially in order to improve and/or train said model.

Now, with respect to the first group 13 and the second group 16, it is noted that the first group 13 of measurement devices may just use the model. It is further noted that the second group 16 of measurement devices may provide feedback information F especially in order to train the model.

Furthermore, with respect the measurement devices 14, 15, 17, it is noted that at least one, exemplarily each, of the measurement devices 14, 15, 17 may provide at least one input signal parameter, exemplarily an abstract input signal parameter AISP, especially for the cloud server 10 or the controller 11. It is further noted that the measurement devices of the second group 16, exemplarily the measurement device 17, may preferably provide feedback information F and an abstract input signal parameter AISP especially for the cloud server 10 or the controller 11.

Figure 4:
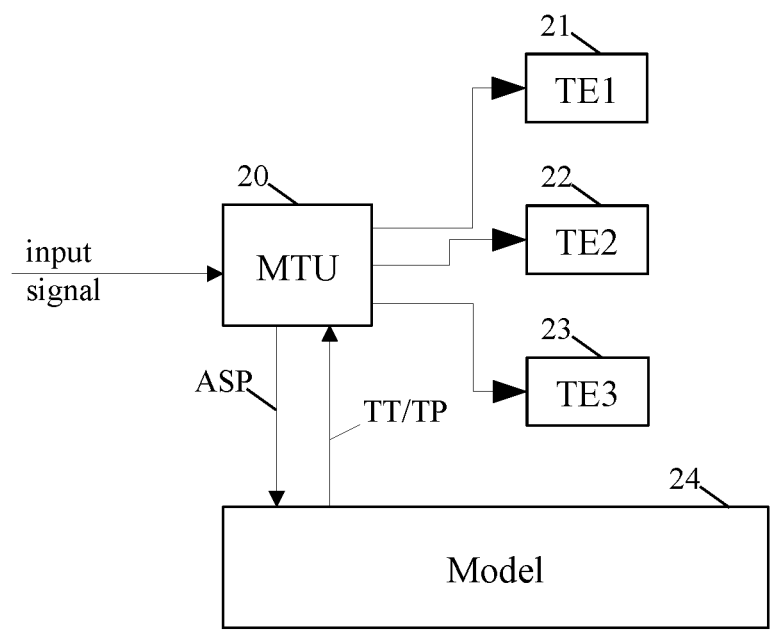
FIG. 4 shows an exemplary embodiment of a trigger unit in accordance with the second aspect of the invention.

Moreover, with respect to the above-mentioned trigger unit, preferably the above-mentioned trigger processor, FIG. 4 illustrates an exemplary embodiment of a multiple trigger unit 20 or a multiple trigger processor, respectively. As it can be seen from FIG. 4, the multiple trigger processor 20 receives an input signal and provides multiple trigger events, exemplarily a first trigger event 21 such as a glitch trigger event, a second trigger event 22 such as a width trigger event, and a third trigger event 23 such as a runt trigger event.

With respect to the above-mentioned trigger processor, it is noted that said trigger processor may especially be a trigger controller.

Furthermore, the multiple trigger unit 20 provides at least one autoset parameter ASP to a model 24 such as the above-mentioned model. Additionally, the multiple trigger unit 20 receives at least one trigger type and/or at least one trigger parameter TT/TP from the model 24. With respect to the model 24, it is noted that the model 24 especially allows for providing predicted trigger settings.

Figure 5:
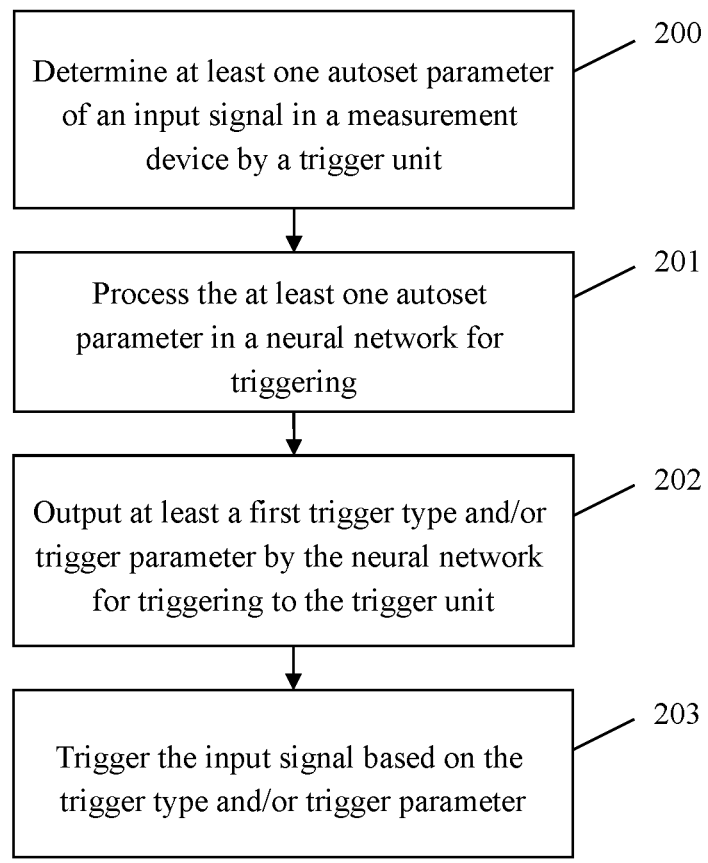
FIG. 5 shows a flow chart of an exemplary embodiment of the third aspect of the invention.

Finally, FIG. 5 shows a flow chart of an exemplary embodiment of the inventive method for autonomous determining a trigger type and/or trigger parameter. In a first step 200, at least one autoset parameter of an input signal in a measurement device is determined by a trigger unit. Then, in a second step 201, the at least one autoset parameter is processed in a neural network for triggering. Furthermore, in a third step 202, at least a first trigger type and/or trigger parameter is outputted by the neural network for triggering to the trigger unit In accordance with step 203 of FIG. 5, it might be particularly advantageous if the method further comprises the step of triggering the input signal based on the trigger type and/or trigger parameter.

With respect to the trigger type, it is noted that the trigger type may especially comprise at least one of a glitch trigger, a width trigger, a runt trigger, a window trigger, a zone trigger, or any combination thereof.

With respect to the trigger parameter, it is noted that the trigger parameter may especially comprise at least one of a threshold value, a width value, a signal period value, or any combination thereof.

With respect to the at least one autoset parameter, it is noted that the at least one autoset parameter may especially comprise at least one of an estimated frequency of the input signal, a peak value of the input signal, a median value of the input signal, a histogram of the input signal, or any combination thereof.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for training a neural network for triggering an input signal in a measurement device, the method comprising the steps of:

providing a trigger type and/or trigger parameter from a cloud server hosting the neural network via a network to the measurement device, triggering the input signal based on the trigger type and/or trigger parameter received in the measurement device, and collecting trigger feedback information from the measurement device at the neural network to train the neural network.

2. The method according to claim 1,
wherein the method further comprises the step of using the trigger feedback information to improve the neural network.

3. The method according to claim 1,
wherein the method further comprises the step of centrally updating the neural network.

4. The method according to claim 1,
wherein the method further comprises the step of continuously improving the neural network.

5. The method according to claim 1,
wherein the cloud server provides more processing power than each of respective local devices.

6. The method according to claim 1,
wherein the trigger type comprises at least one of a glitch trigger, a width trigger, a runt trigger, a window trigger, a zone trigger, or any combination thereof.

7. The method according to claim 1,
wherein the trigger parameter comprises at least one of a threshold value, a width value, a signal period value, or any combination thereof.

8. The method according to claim 1,
wherein the method further comprises the step of autonomously determining the trigger type and/or trigger parameter.

9. The method according to claim 1,
wherein the method further comprises the step of determining at least one autoset parameter of the input signal.

10. The method according to claim 9,
wherein the method further comprises the step of processing the at least one autoset parameter in the neural network for triggering.

11. The method according to claim 9,
wherein the at least one autoset parameter comprises at least one of an estimated frequency of the input signal, a peak value of the input signal, a median value of the input signal, a histogram of the input signal, or any combination thereof.

12. The method according to claim 1,
wherein the method further comprises the step of outputting at least a first trigger type and/or trigger parameter by the neural network for triggering.

13. A cloud server for training a neural network for triggering an input signal in a measurement device, the cloud server comprising:

a controller, wherein the controller is configured to provide a trigger type and/or trigger parameter from the cloud server hosting the neural network via a network to the measurement device, and wherein the controller is configured to collect trigger feedback information from the measurement device at the neural network to train the neural network.

14. The cloud server according to claim 13,
wherein the controller is further configured to trigger the input signal based on the trigger type and/or trigger parameter received in the measurement device.

15. A method for autonomous determining a trigger type and/or trigger parameter, the method comprising the steps of:

determining at least one autoset parameter of an input signal in a measurement device by a trigger unit, processing the at least one autoset parameter in a neural network for triggering, and outputting at least a first trigger type and/or trigger parameter by the neural network for triggering to the trigger unit.

16. The method according to claim 15,
wherein the method further comprises the step of triggering the input signal based on the trigger type and/or trigger parameter.

17. The method according to claim 15,
wherein the trigger type comprises at least one of a glitch trigger, a width trigger, a runt trigger, a window trigger, a zone trigger, or any combination thereof.

18. The method according to claim 15,
wherein the trigger parameter comprises at least one of a threshold value, a width value, a signal period value, or any combination thereof.

19. The method according to claim 15,
wherein the at least one autoset parameter comprises at least one of an estimated frequency of the input signal, a peak value of the input signal, a median value of the input signal, a histogram of the input signal, or any combination thereof.

* * * * *